United States Patent [19]

Nardone et al.

[11] 3,731,260
[45] May 1, 1973

[54] SOCKET HOUSING

[75] Inventors: Prisco D. Nardone, Rochester; Ronald G. Hollett, Roseville; James E. Warrick, Birmingham, all of Mich.

[73] Assignee: Microdot Inc., Greenwich, Conn.

[22] Filed: May 6, 1971

[21] Appl. No.: 140,674

[52] U.S. Cl. ................. 339/127 R, 339/128, 248/27
[51] Int. Cl. ............................................. H01r 13/60
[58] Field of Search .................... 339/127, 128, 126, 339/217 S; 24/208 A; 248/27; 285/DIG. 22, 162

[56] References Cited

UNITED STATES PATENTS

| | | | |
|---|---|---|---|
| 2,721,245 | 10/1955 | Arisman et al. | 339/128 X |
| 3,366,729 | 1/1968 | Pauza | 339/128 |
| 3,473,015 | 10/1969 | Haas et al. | 339/127 R X |

*Primary Examiner*—Richard E. Moore
*Attorney*—Harness, Dickey & Pierce

[57] ABSTRACT

The invention relates to a novel configuration for the housing portion of a lamp socket which is insertable through a notched aperture in a panel or the like. The housing has at least one finger which flexes circumferentially thereof when passing through a notch in the wall of the panel aperture. A rigid detent is circumferentially spaced from the flexible finger. After the detent passes beyond the edge of the aperture it is advanced thereover by rotation of the housing in a locking direction produced by the bias of the flexible finger on an edge portion of the aperture to lock the housing within the aperture. Additional notches may be provided for other fingers and detents if a greater bias or locking overlap is necessary. To remove the housing from the panel the housing is rotated in the opposite direction to the locking direction to flex the finger until the detent clears the edge of the notch so that the housing can be pulled outwardly thereof.

5 Claims, 6 Drawing Figures

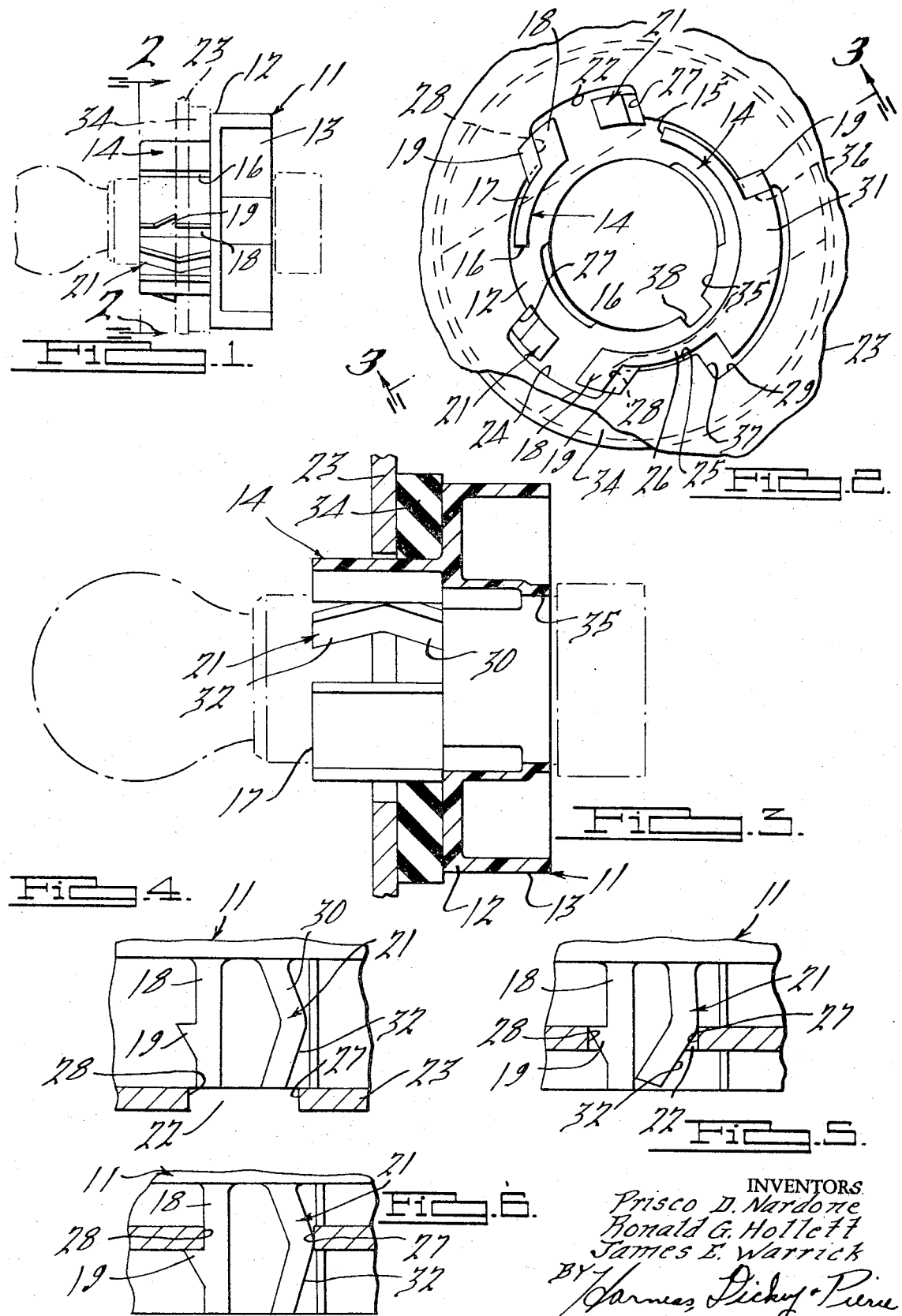

SOCKET HOUSING

BACKGROUND OF THE INVENTION

The invention is an improvement of the socket housing described in U.S. Pat. No. 3,548,363.

SUMMARY OF THE INVENTION

The invention relates to a novel configuration for the housing portion of a lamp socket which is insertable through a notched aperture in a panel or the like. The housing has at least one finger which flexes circumferentially thereof when passing through a notch in the wall of panel aperture. A rigid detent is circumferentially spaced from the flexible finger. After the detent passes beyond the edge of the aperture it is advanced thereover by rotation of the housing in a locking direction produced by the bias of the flexible finger on an edge portion of the aperture to lock the housing within the aperture. Additional notches may be provided for other fingers and detents if a greater bias or locking overlap is necessary. To remove the housing from the panel the housing is rotated in the opposite direction to the locking direction to flex the finger until the detent clears the edge of the notch so that the housing can be pulled outwardly thereof.

BRIEF DESCRIPTION OF THE DRAWING

FIG. 1 is a view of a housing in association with a socket portion which supports a lamp bulb.

FIG. 2 is an enlarged plain view of the housing shown in FIG. 1, as viewed from line 1—1 thereof;

FIG. 3 is an enlarged sectional view of the structure illustrated in FIG. 2, taken on the line 3—3 thereof;

FIG. 4 is a broken view of the housing illustrated in FIG. 1, before the insertion of a detent and flexible finger into a notch extending radially outwardly of the panel aperture;

FIG. 5 is a view of the structure illustrated in FIG. 4, showing a relationship of the detent and finger when advanced into the edges of the notch, and FIG. 6 is a view of the structure illustrated in FIGS. 4 and 5, after the housing has been completely inserted and secured within the panel aperture.

DESCRIPTION OF THE PREFERRED EMBODIMENT

Referring to the Figures, a housing 11 has a cylindrical washer-like portion 12, an extending substantially rectangular portion 13 at one side and a cylindrical portion 14 on the other side which is interrupted at 15 and 16. One end of the cylindrical section 17 has an upwardly extending rigid post 18 from the face of which a triangular shape detent 19 extends forwardly to be located tangentially of the engaged cylindrical section 17. Spaced from the rigid post 18 but in circumferential alignment therewith a flexible finger 21 of V-shape which extends upwardly and slopes away from the post 18 at the bottom half 30 and toward the post at the top half 32. The top sloping portion 32 provides a cam surface which deflects the finger toward the post 18 when the finger and post are inserted in a notch 22 extending outwardly of an aperture 25 in a panel 23 or like socket supporting member. A similar notch 24 extends outwardly of the aperture 25 located approximately 120° from the notch 22. One end of a cylindrical section 26 is similarly provided with a post 18 and a detent 19 and an adjacent flexible finger 21. The two sets of detents and fingers are in the same relation to each other and to the edges 27 and 28 of the spaced notches 22 and 24.

A third notch 29 extends outwardly of the aperture 25 within the panel 23 spaced substantially 120° from the notches 22 and 24. A post 31 of substantial length is provided on the cylindrical section 26 having a detent 19 on the forward face extending in the same direction as the detents 19 on the other posts 18. The notch 29 is of greater width between the opposite edges 36 and 37 than the notches 22 and 24 which can only receive the post 31 to thereby orient the housing within the aperture 25 of the panel 23.

The finger and detent relationship is illustrated in FIGS. 4 to 6 wherein the upper sloping section 32 of the finger 21 will pass over the edge 27 of the notch 22 and will be deflected toward the posts 18 as it advances into the notch, as illustrated in FIG. 5. The fingers 21 and posts 18 are aligned with the notches 22 and 24 when the post 31 is aligned with the notch 29 through which it can pass. The detent 18 will pass over the edge 28 to further deflect the finger 21 to the position illustrated in FIG. 5. A further advancement of the housing 11 into the aperture 25 will move the detents 19 beyond the notch edges of the panel and permit the fingers to rotate the housing and advance the detents 19 over the edges 28 and 36 of the notches 22, 24 and 29 to fixedly retain the housing on the panel. A flexible sealing washer 34 may be placed against the washerlike portion 13 so that it will engage the outer side of the panel 23 about the aperture 25 to seal the housing to the panel.

It is to be understood that the lamp supporting portion of the socket is of conventional construction and will be mounted within the cylindrical portion 14 at one side of the washer and the cylindrical portion 35 in the substantially rectangular portion 13 on the other side thereof. The lamp supporting portion can be made of plastic material with metal contacts or of metal and provided with bayonet slots and an orienting slot which will extend into the slot 38 of the housing. The slot 38 orients the lamp supporting portion relative to the housing so that the filaments of the bulb will be properly positioned when supported in the housing which was oriented in the aperture 25 of the panel.

The construction is believed to be unique since the detent and flexible fingers are disposed tangent to a circle and so mounted relative to opposite edges 27 and 28 of the notches 22 and 24 as to produce the deflection of the flexible fingers when the housing is advanced into the aperture 25. After insertion, the fingers 21 will rotate the housing and advance the detents 19 over the edge of the notches and retain them in locked position relative thereto. The rectangular portion at the base of the housing permits the housing to be grasped and rotated in the opposite direction to deflect the fingers until the detents 19 pass beyond the edges of the notches so that they can pass outwardly of the aperture when the housing is withdrawn therefrom. It is to be understood that one or more of the flexible fingers may be employed with one or more notches for securing the housing within the aperture 25 by a forward movement thereof. Three equally spaced detents are herein illustrated for retaining the housing within the aperture 25 while only two of the deflectable fingers are utilized to produce the rotation of the housing to locked position on the panel. The elongated post 31 having the detent 19 provided thereon requires a notch of greater length between the edges 36 and 37 which produces the proper orientation of the housing 11 relative to the aperture 25 when inserting the housing thereinto. Sufficient bias is provided by the two fingers to produce the rotation of the housing 11 and advancement of the detents 19 over the edges of the notches to retain the housing in locked position within the aperture. It will be noted that the facing surfaces of the fingers and posts are located in planes which permit the separation of the mold parts after the molding operation.

We claim:

1. A lamp socket housing for acceptance in an apertured panel, said housing comprising a cylindrical portion having a radially extending flange positionable on one side of said panel, a plurality of circumferentially extending rigid detents on said housing axially spaced from said flange and engageable with the opposite side of said panel, and a flexible resilient element on said housing separate from said detents and circumferentially deflectable in one direction upon insertion of said housing through the aperture in said panel, said resilient element being engageable with an edge portion of the aperture in the panel so as to maintain a circumferential bias on said housing and effect rotation thereof about its longitudinal axis thereby to engage said detents over the opposite side of said panel.

2. A lamp socket housing as recited in claim 1, wherein a second flexible element on said housing is spaced from said detents, so that both elements will urge the rotation of the housing to move the detents over the opposite surface of the panel and retain them in locked position upon insertion of the housing in said aperture.

3. A housing for supporting a lamp socket within an aperture in a panel or the like, a body element of cylindrical form having a radially extending flange, posts extending from one side of the flange having a detent on the forward face thereof, and a flexible finger extending from the same side of said flange circumferentially aligned with one of said posts in spaced relation thereto, said finger being of V-shape having a bottom portion sloping away from said post and a top portion sloping toward said post.

4. A housing as recited in claim 3, wherein a second finger similar to said first finger is extended from the same side of the flange and spaced from a second post.

5. A housing as recited in claim 4, wherein three detents are provided, the third detent is supported on a third post which is of greater circumferential length than the overall distance between a finger and its associated post for orienting said housing relative to the panel on which it is to be mounted and secured by said three detents.

* * * * *